(12) United States Patent
Feng

(10) Patent No.: US 9,801,497 B2
(45) Date of Patent: Oct. 31, 2017

(54) ELECTRIC FRYING PAN

(71) Applicant: Nomura USA, Inc., Grand Prairie, TX (US)

(72) Inventor: Jinzhao Feng, Foshan (CN)

(73) Assignee: Nomura USA, Inc., Grand Prairie, TX (US)

( * ) Notice: Subject to any disclaimer, the term of this patent is extended or adjusted under 35 U.S.C. 154(b) by 432 days.

(21) Appl. No.: 14/059,495

(22) Filed: Oct. 22, 2013

(65) Prior Publication Data

US 2014/0305319 A1    Oct. 16, 2014

(30) Foreign Application Priority Data

Oct. 23, 2012    (CN) .................... 2012 2 0543958 U

(51) Int. Cl.
*A47J 37/10*    (2006.01)
*A47J 37/00*    (2006.01)

(52) U.S. Cl.
CPC .......... *A47J 37/105* (2013.01); *A47J 37/108* (2013.01)

(58) Field of Classification Search
CPC ...... A47J 3/00; A47J 3/10; A47J 37/00; A47J 37/10
USPC .......... 99/324, 422–430, 402; 219/385–388, 219/432, 450.1–455.11; 126/299 R–299 F
See application file for complete search history.

(56) References Cited

U.S. PATENT DOCUMENTS

| | | | |
|---|---|---|---|
| 3,714,885 A * | 2/1973 | Wertheimer et al. | 99/425 |
| 3,811,375 A * | 5/1974 | Fritzsche | 99/425 |
| 4,034,663 A * | 7/1977 | Jenn et al. | 99/446 |
| 4,517,886 A * | 5/1985 | Bales | 99/425 |
| 4,608,917 A * | 9/1986 | Faaborg | 99/340 |
| 4,662,273 A * | 5/1987 | Marchioni | 99/426 |
| 4,972,766 A * | 11/1990 | Anetsberger | 99/332 |
| 5,351,673 A * | 10/1994 | Somerton | F24C 15/12 126/214 D |
| 5,542,347 A * | 8/1996 | Joseph | A47J 37/101 126/299 C |
| 5,967,136 A * | 10/1999 | Gray | F24C 15/2042 126/299 C |
| 6,433,312 B1 | 8/2002 | Chen | |
| 6,546,850 B1 * | 4/2003 | Akiyama-Warren | 99/427 |
| D514,871 S * | 2/2006 | May | D7/337 |
| 7,472,698 B1 * | 1/2009 | Anibas | F24C 15/102 126/1 R |

(Continued)

FOREIGN PATENT DOCUMENTS

CN    1765271 A    5/2006
CN    201595702    10/2010

(Continued)

*Primary Examiner* — Michael LaFlame, Jr.
(74) *Attorney, Agent, or Firm* — Mark D. Perdue

(57) ABSTRACT

An electric cooking appliance comprises a base frame having a front and rear and left and right sides connecting the front and rear. A generally planar, electrically heated cooking surface is supported by the base frame and has a front and rear edge and a pair of sides connecting the front and rear edges. A splash guard is removably or secured to and extends upwardly from the rear edge and a portion of each of the sides of the cooking surface. A recess or groove is formed in the cooking surface to collect excess cooking oil; and an oil reservoir is carried by the base frame and in fluid communication with the recess in the cooking surface to collect cooking oil from the recess.

14 Claims, 6 Drawing Sheets

(56) References Cited

U.S. PATENT DOCUMENTS

| | | | |
|---|---|---|---|
| 2004/0159651 A1* | 8/2004 | McFarland | H05B 3/74 219/452.12 |
| 2004/0173201 A1* | 9/2004 | Haemerle | F24C 15/12 126/299 C |
| 2004/0217109 A1 | 11/2004 | Chang | |
| 2008/0241328 A1* | 10/2008 | Wolf | A47J 37/067 426/523 |
| 2009/0025705 A1* | 1/2009 | Hatjopoulos | F24C 15/12 126/214 D |
| 2009/0101024 A1* | 4/2009 | Button | A47J 37/067 99/422 |

FOREIGN PATENT DOCUMENTS

| | | |
|---|---|---|
| CN | 201646187 | 11/2010 |
| CN | 102048460 A | 5/2011 |
| CN | 201595701 | 10/2012 |
| EP | 1400193 A | 3/2004 |

\* cited by examiner

ELECTRIC FRYING PAN

PRIORITY CLAIM

This application claims priority under 35 U.S.C. §119 to Chinese Utility Model 201220543958.1, filed Oct. 23, 2012.

TECHNICAL FIELD

The present invention relates generally to improvements in cooking appliances and more particularly to improvements in electric griddles or frying pans regarding prevention of cooking oil splashes.

BACKGROUND OF THE INVENTION

One problem with electric frying pans of the griddle type is the possibility of hot cooking oil splashing or spattering from the flat cooking surface. This can be messy and pose a danger to cooks and bystanders. Some electric griddles are provided with a splash guard or shield in the form of an upright wall or coaming that partially surrounds the perimeter of the griddle, preventing splashing and spattering and saving oil and even assisting in retaining heat at the surface of the griddle.

However, such splash guards are permanently attached (such as by welding) to the griddle and raise its height, as well as interrupting the flat upper surface of the griddle. These designs cause the griddle to take up more space and pose storage and transportation difficulties.

SUMMARY OF THE INVENTION

It is a general object of the present invention to provide an improved electric griddle or frying pan. This and other objects of the invention are achieved by an electric cooking appliance comprising a base frame having a front and rear and left and right sides connecting the front and rear. A generally planar, electrically heated cooking surface is supported by the base frame and has a front and rear edge and a pair of sides connecting the front and rear edges.

A splash guard is removably or detachably secured to and extends upwardly from the rear edge and a portion of each of the sides of the cooking surface.

A recess or groove is formed in the cooking surface to collect excess cooking oil; and an oil reservoir is carried by the base frame and in fluid communication with the recess in the cooking surface to collect cooking oil from the recess.

According to an embodiment of the invention, the splash guard comprises a long or central portion generally coextensive with the rear edge of the cooking surface and extending upwardly therefrom; and a pair of short portions, each short portion removably coupled to the long portion and extending along a portion of one of the sides of the cooking surface and extending upwardly therefrom.

According to an embodiment of the invention, the oil reservoir is removably coupled to the base frame.

According to an embodiment of the invention, the oil reservoir is disposed under the cooking surface at the front of the base frame and is pivotally and removably coupled to the base frame.

Other objects, features, and advantages of the present invention will become apparent to those skilled in the art with reference to the drawings and the detailed description of the invention, which follow.

DETAILED DESCRIPTION OF THE INVENTION

Figure 1:
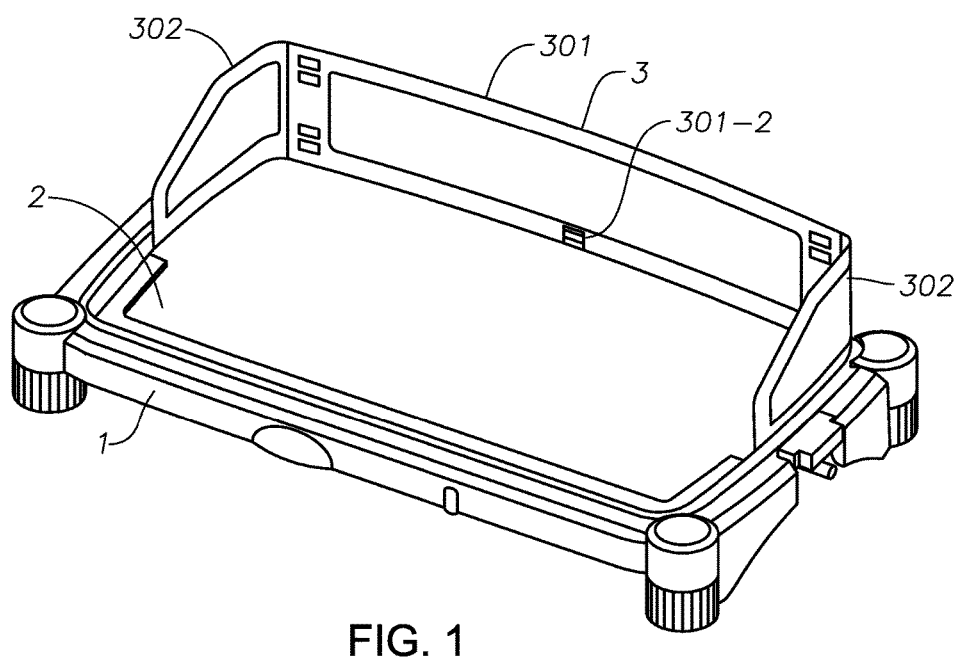
FIGS. 1 and 2 are front and rear perspective views of the cooking appliance according to the present invention.
Figure 2:
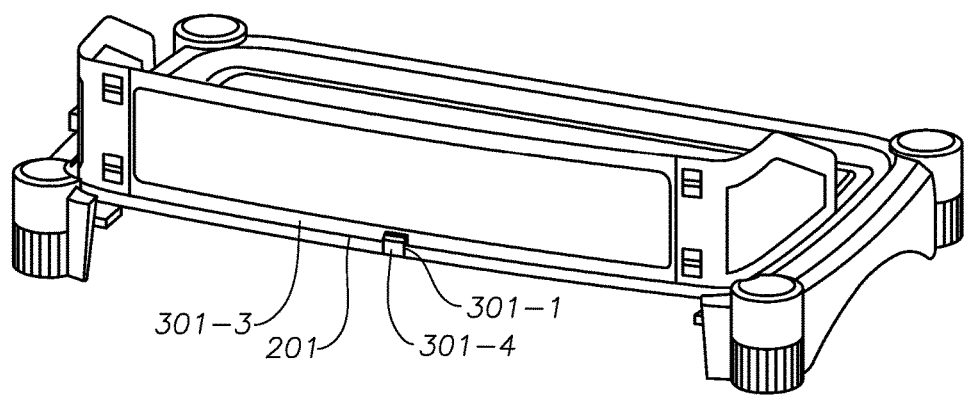
Figure 3:
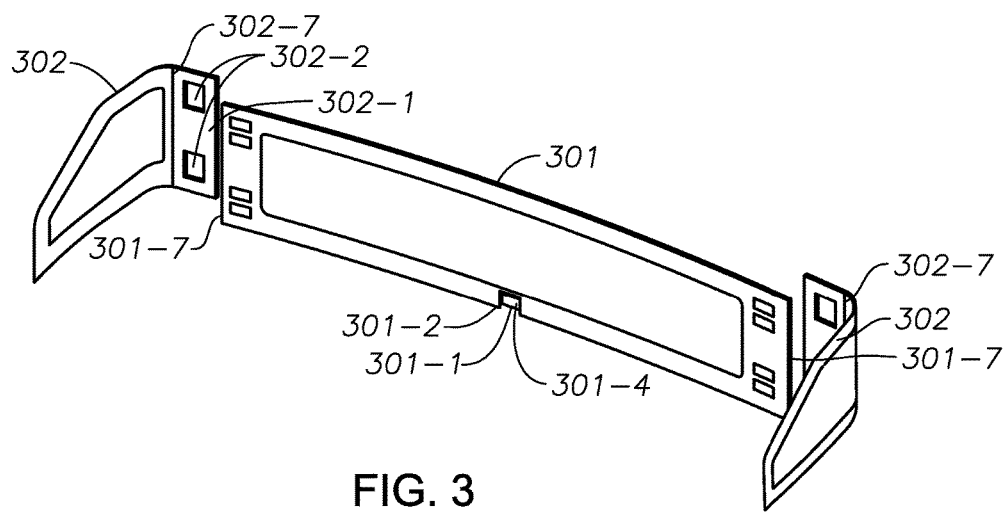
FIGS. 3 and 4 are exploded perspective views of the splash guard of the cooking appliance of FIGS. 1 and 2.
Figure 4:
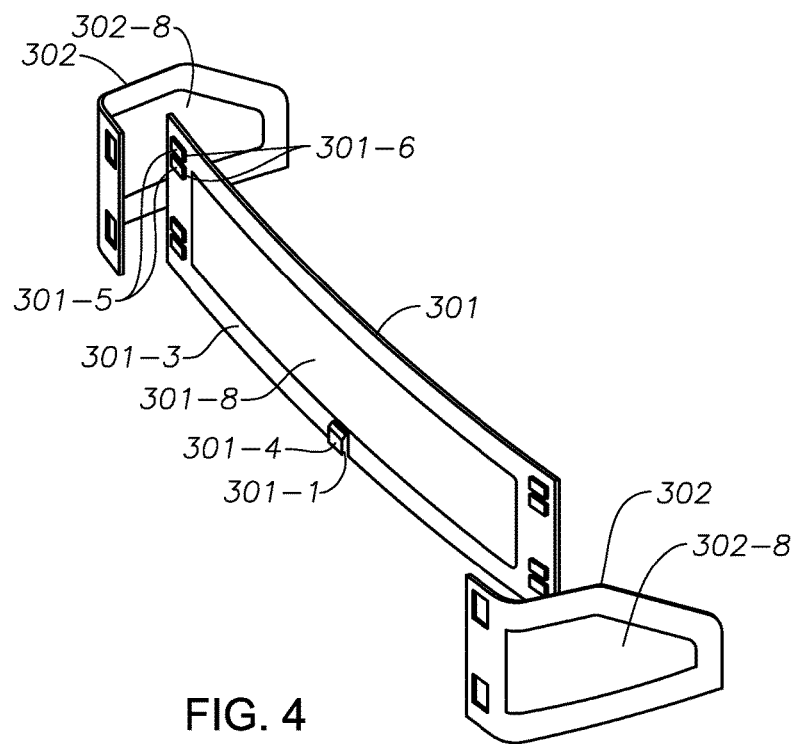
Figure 5:
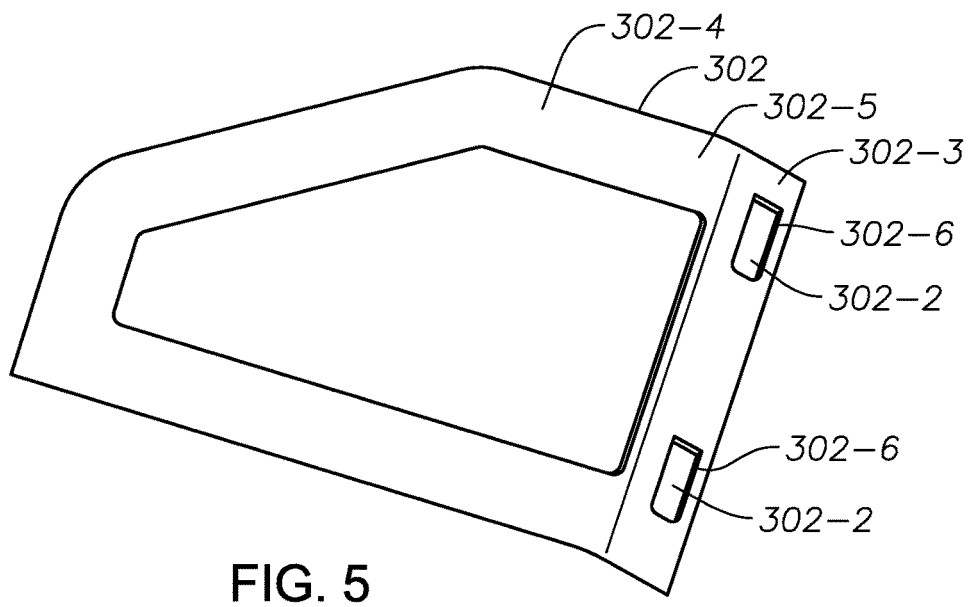
FIGS. 5 and 6 are enlarged views of a portion of the splash guard of FIGS. 3 and 4.
Figure 6:
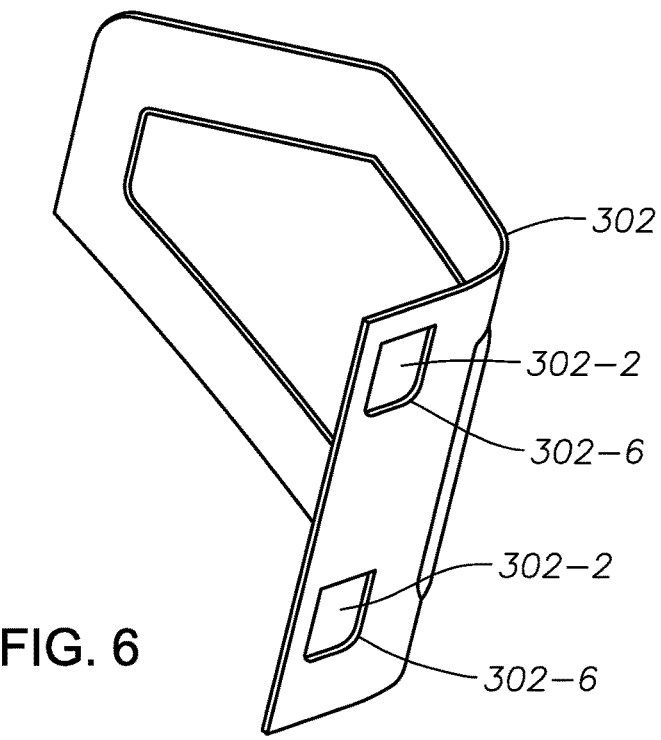
Figure 7:
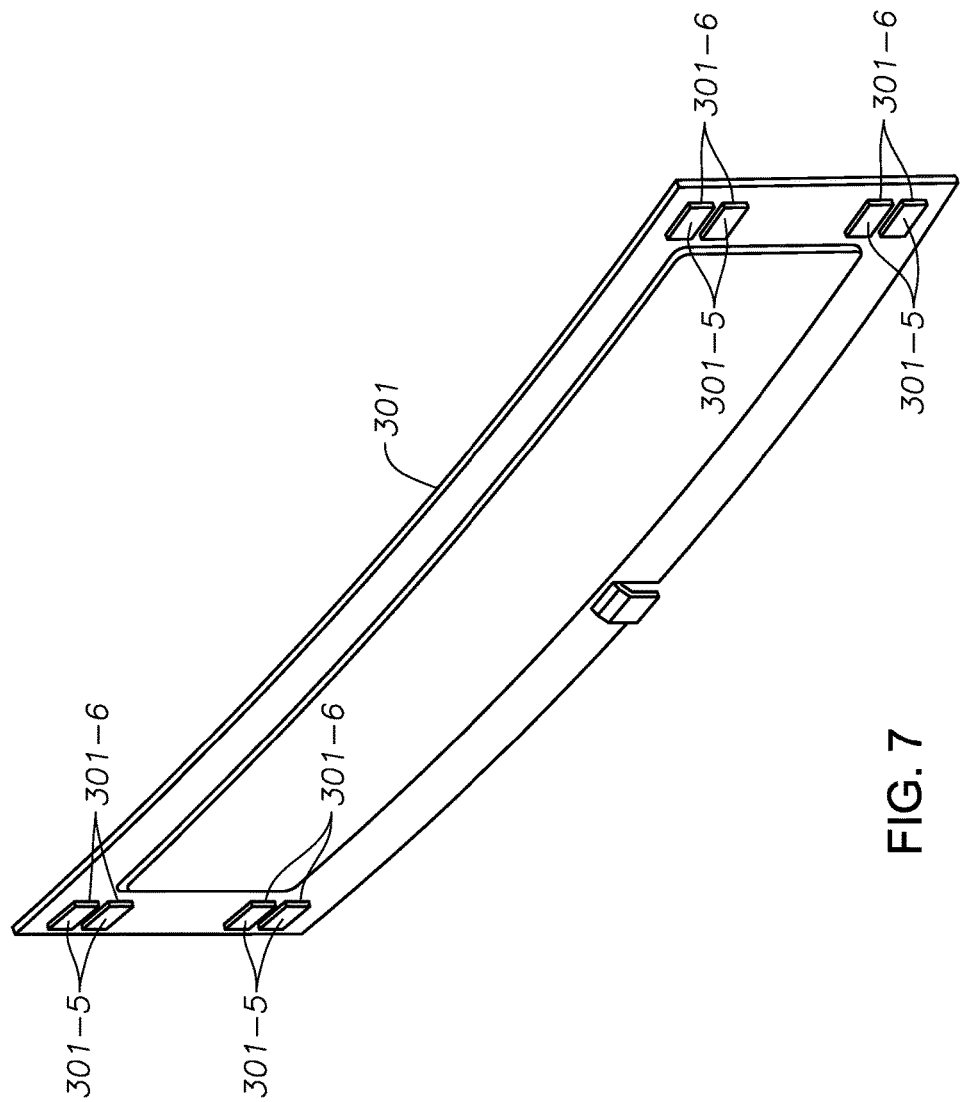
FIG. 7 is an enlarged view of another portion of the splash guard of FIGS. 3 and 4.

Referring now to the Figures, and specifically to FIGS. 1 and 2, an electrical cooking appliance in the form of a frying pan or griddle is illustrated. The appliance comprises a base frame 1 that supports an electrically heated cooking surface 2. Cooking surface 2 is generally flat or planar in the form of a rectangular griddle with a perimeter or periphery comprising pair of (front and rear) long sides or edges and a pair of (left and right) short sides or edges that connect the long sides. A small upturned lip 201 extends around the periphery of cooking surface 2 to prevent cooking oil from spilling off the surface.

A splash guard or oil retaining frame 301, 302 extends upwardly from the rear long side 301 and a portion 302 of each of the short sides of cooking surface 2. Splash guard 301, 302 serves to prevent splatters and splashes of hot cooking oil from cooking surface 2.

As seen in FIGS. 3 through 7, the splash guard comprises three parts: a central or long portion 301, with a pair of side portions 302 coupled to the long portion to form a U shape. Long portion 301 is generally coextensive in length and shape with the rear edge or side of cooking surface 2 (and base frame 1). Side portions 302 are coupled to the ends of central or long portion 301 and extend along only a portion of the side edges of cooking surface 2 so that the front and front sides of cooking surface 2 are unobstructed. Central and side portions 301, 302 may be formed of sheet metal or molded, heat-resistant plastic. Sheet metal construction is illustrated.

An attachment tab 301-1 may be formed in a central portion of a lower edge 301-3 of central portion 301. Tab 301-1 may be formed by conventional stamping operations. Lower edge 301-3 is received in a narrow groove 202 formed in cooking surface 2 inward of lip 201 and tab 301-1 engages a portion of cooking surface 2 by friction fit to removably or detachably secure central portion 301 in upstanding fashion to the cooking appliance.

A pair of side portions 302 are coupled to central portion 301 at its ends 301-7. Each side portion is similar, but mirror-imaged, and extends approximately half-way down the sides of cooking surface 2, so that the front and front sides of cooking surface remain unobstructed. Side portions 302 are connected to ends 301-7 of central portion 301 by a pair of tabs 302-2, which may be stamped from the sheet metal of side portions 302. Tabs 302-2 are received in receptacle loops 301-5 that are stamped in the sheet metal of central portion 301. Like central portion 301, the lower edges of side portions 302 are received in groove 202.

Side portions 302 may also be provided with stamped tabs 302-4 (similar to tab 301-4) to frictionally engage a portion of cooking surface 2 to assist in retaining the assembled oil splash guard 301, 302 on cooking surface 2.

Figure 8:
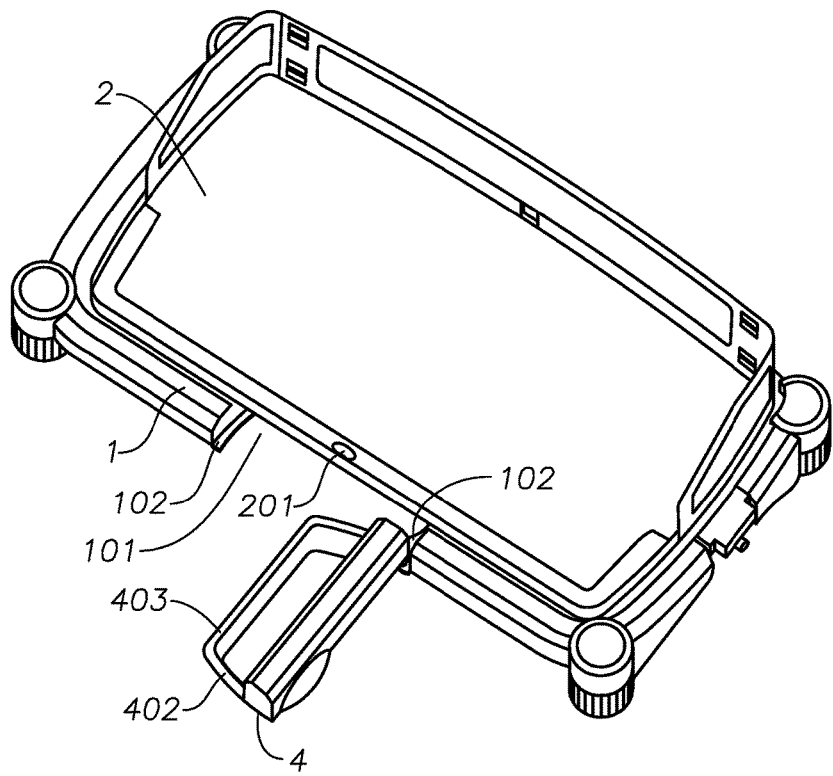
FIG. 8 is a perspective view of the cooking appliance of FIGS. 1 and 2 illustrating a cooking oil reservoir.
Figure 9:
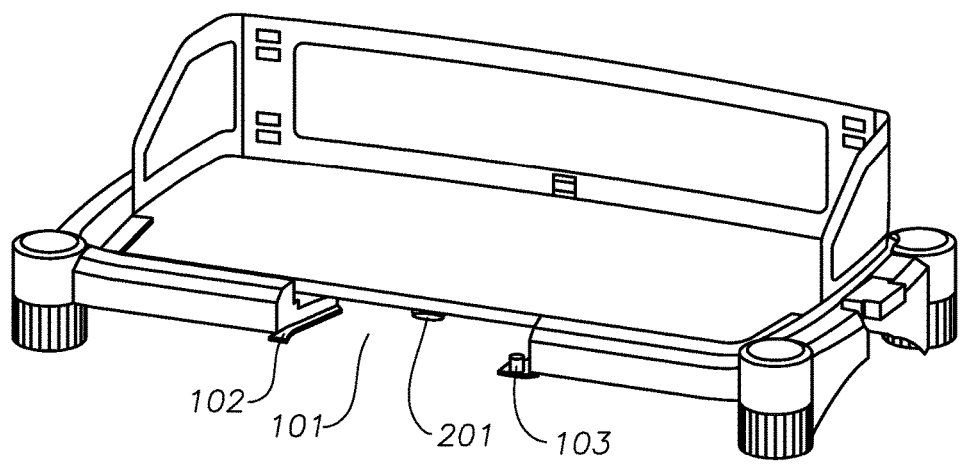
FIG. 9 is a perspective view of the cooking appliance of FIG. 8 with the cooking oil reservoir removed.
Figure 10:
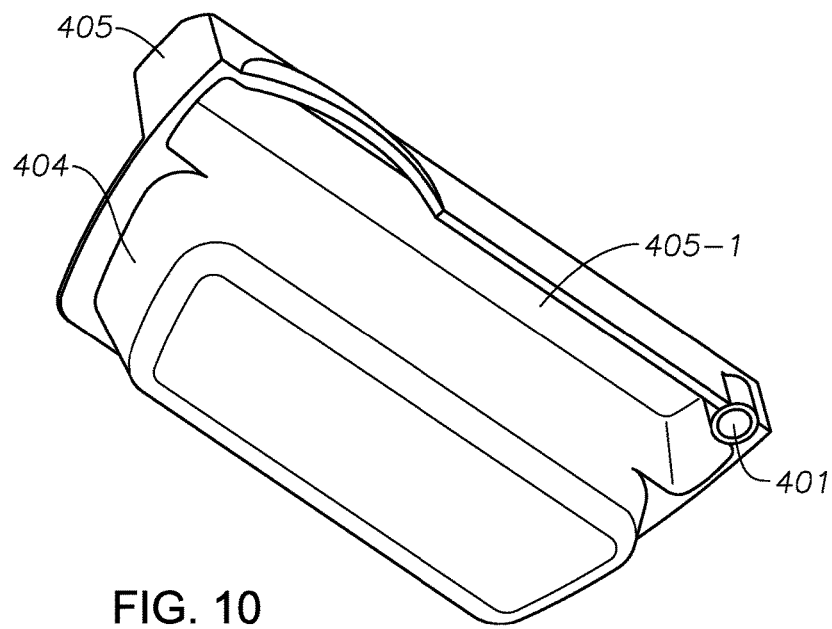
FIG. 10 is a perspective view of the cooking oil reservoir.
Figure 11:
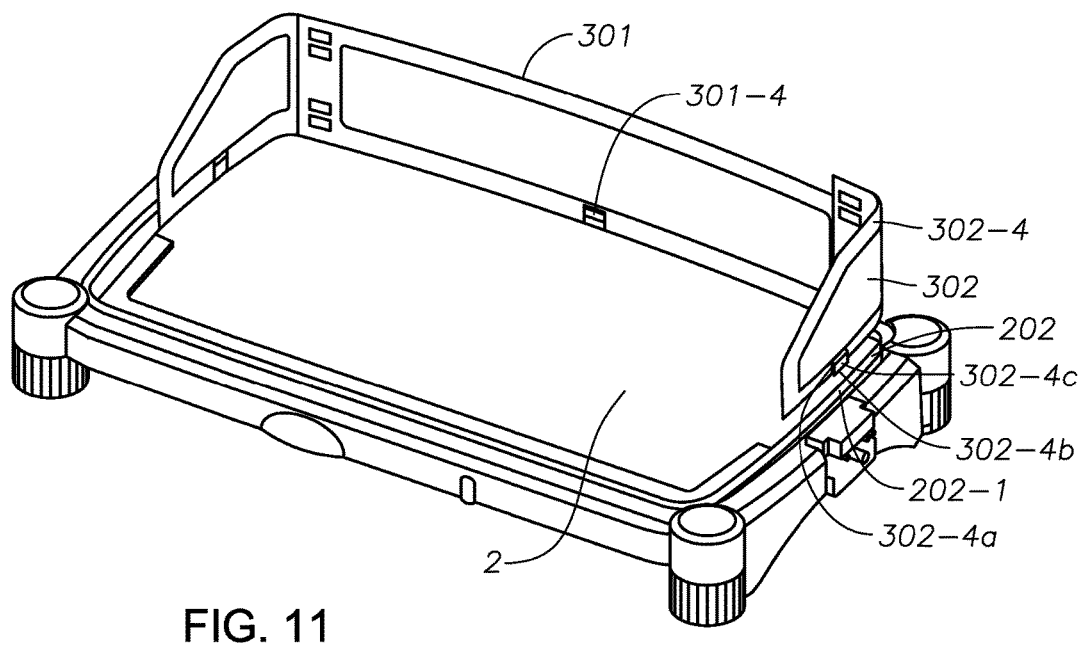
FIG. 11 is a perspective view of the cooking appliance of FIGS. 1 and 2.

The cooking appliance according to the present invention may also be provided with a removable cooking oil reservoir or receptacle 4, as shown in FIGS. 8 through 10. A groove or recess 203 may be formed in the periphery of cooking surface 2 just inside of lip 201 at the front long side and extending up a portion of the right and left sides of cooking surface 2. Cooking oil drips or flows into groove or recess 203, which may be inclined or sloped toward a central aperture 205 in the front side of groove 203 that drains oil into receptacle or reservoir 4.

Reservoir 4 has a removable portion that may be received in a slot or recess 102 in base frame 1. A front portion 401 may be flush with and has an appearance similar to that of base frame 1. It may be provided with a collector cavity 403 to receive a volume of cooking oil from cooking surface 2. A recess 405 on one side receives and pivots about a lug 103 at the front and side of slot 102 and can be lifted off of lug 103 for removal and cleaning. Reservoir 4 thus may be positioned under the aperture in groove 201 in cooking surface 2 to receive and collect cooking oil from the cooking surface for reuse or disposal. This reservoir 4 contributes also to prevention of splashing by providing a place for excess cooking oil to collect, thereby removing it from the cooking surface where it is subject to splatter.

In operation, the cooking appliance according to the invention may be shipped and stored with oil splash guard 301, 302 removed and disassembled, reducing the volume occupied by the appliance. Prior to cooking, splash guard is assembled by coupling together central and side portions 301, 302 using tabs 302-4 and receptacles 301-5. Assembled splash guard 301, 302 then is attached to cooking surface 2. Cooking may proceed with the front and front sides of cooking surface 2 unobstructed and rear sides and rear protected against splashes and spatters of cooking oil by oil splash guard 301, 302. Excess cooking oil will be collected by gravity into groove 203 and drained into oil reservoir 4. Reservoir 4 may be opened by pivoting it outwardly from base frame 1, where cavity 403 may be wiped out. Additionally, reservoir 4 may be removed from pivot 103 for washing or emptying.

The invention has been described with reference to preferred embodiments thereof, it is thus not limited, but is susceptible to variation and modification without departing from the scope and spirit of the invention.

I claim:

1. An electric cooking appliance comprising:
   a base frame;
   a generally planar, electrically heated cooking surface supported by the base frame, the cooking surface having a perimeter including a pair of long sides and a pair of short sides connecting the long sides;
   a splash guard formed of a sheet material having an edge removably secured to and extending along one of the long sides and a portion of each of the short sides of the perimeter of the cooking surface, the splash guard extending generally vertically upwardly from the sides of the cooking surface; and
   an oil collection reservoir in fluid communication with the cooking surface, the reservoir pivotally mounted in the base frame adjacent one of the long sides of the cooking surface, wherein the reservoir is accessible for cleaning by pivoting the reservoir to an open position.

2. The cooking appliance of claim 1, wherein the splash guard comprises:
   a long portion formed of sheet metal and generally coextensive in length with one of the long sides of the perimeter of the cooking surface and extending vertically upwardly therefrom;
   a pair of short portions, each short portion formed of sheet metal and coupled to an end of the long portion and extending along a portion of one of the short sides of the perimeter of the cooking surface and extending vertically upwardly therefrom.

3. The cooking appliance of claim 1 further comprising:
   an oil collection groove formed around a portion of a perimeter of the cooking surface to collect cooking oil, the oil collection groove in fluid communication with the oil collection reservoir.

4. cooking appliance of claim 3, wherein the oil collection reservoir is pivotally coupled to a front portion of the base frame, wherein the reservoir pivots between an open position in which it can be cleaned, and a closed position where the reservoir is flush with the base frame.

5. An electric cooking appliance comprising:
   a base frame having a front and rear and left and right sides connecting the front and rear;
   a generally planar, electrically heated cooking surface supported by the base frame, the cooking surface having a front and rear edge and a pair of sides connecting the front and rear edges;
   a splash guard formed of a sheet material and having an edge removably secured to and extending along the rear edge of the cooking surface and along a portion of each of the sides of the cooking surface, the splash guard extending generally vertically upward from the rear edge and sides of the cooking surface;
   a recess formed in a periphery of the cooking surface to collect excess cooking oil; and
   an oil reservoir pivotally coupled to the front side of the base frame to pivot between an open position for cleaning and a closed position in communication with the recess in the cooking surface to collect cooking oil from the cooking surface.

6. The cooking appliance of claim 5, wherein the splash guard comprises:
   a long portion generally coextensive with the rear edge of the cooking surface and extending upwardly therefrom;
   a pair of short portions, each short portion removably coupled to the long portion and extending along a portion of one of the sides of the cooking surface and extending upwardly therefrom.

7. The cooking appliance of claim 3, wherein the oil reservoir is removably coupled to the base frame.

8. The cooking appliance of claim 5, wherein the oil reservoir is disposed under the cooking surface at the front of the base frame.

9. An electric cooking appliance comprising:
   a base frame having a front and rear and left and right sides connecting the front and rear;
   a generally planar, electrically heated cooking surface supported by the base frame, the cooking surface having front and rear edges and a pair of sides connecting the front and rear edges;
   a three-piece, laminar, sheet metal splash guard having an edge removably secured to the rear edge and a portion of each of the sides of the cooking surface, the splash guard extending generally vertically upwardly from the cooking surface;
   a recess formed in a periphery of the cooking surface to collect excess cooking oil, the recess formed adjacent the front edge and sides of the cooking surface; and an oil reservoir carried by the base frame adjacent the front edge of the cooking surface and in fluid communication with the recess in the cooking surface to collect cooking oil from the recess, the oil reservoir disposed under the cooking surface and pivotally and removably coupled to the base frame, wherein the oil reservoir is pivoted outwardly from the base frame for cleaning and removal.

10. The cooking appliance of claim 9, wherein the splash guard comprises:
   a long portion generally coextensive with the rear edge of the cooking surface and extending upwardly therefrom;
   a pair of short portions, each short portion removably coupled to an end of the long portion and extending along a portion of one of the sides of the cooking surface and extending upwardly therefrom.

11. The cooking appliance of claim 9, wherein the oil reservoir is removably coupled to the base frame.

12. The cooking appliance of claim 1, wherein the splash guard is removably secured to the appliance by at least one tab engaged with a portion of the appliance.

13. The cooking appliance of claim 5, wherein the splash guard is removably secured to the appliance by at least one tab engaged with a portion of the appliance.

14. The cooking appliance of claim 9, wherein the splash guard is removably secured to the appliance by at least one tab engaged with a portion of the appliance.

* * * * *